United States Patent
Mittal et al.

(10) Patent No.: US 10,305,568 B1
(45) Date of Patent: May 28, 2019

(54) CODING MAIN BEAM INFORMATION IN CSI CODEBOOK

(71) Applicant: Motorola Mobility LLC, Chicago, IL (US)

(72) Inventors: Udar Mittal, Rolling Meadows, IL (US); Tyler Brown, Lake Zurich, IL (US); Khalid Zeineddine, Evanston, IL (US); Jiho Song, Naperville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/844,147

(22) Filed: Dec. 15, 2017

(51) Int. Cl.
*H04B 7/06* (2006.01)
*H04B 7/0456* (2017.01)
*H04B 7/0452* (2017.01)

(52) U.S. Cl.
CPC ......... *H04B 7/0626* (2013.01); *H04B 7/0452* (2013.01); *H04B 7/0478* (2013.01); *H04B 7/0697* (2013.01)

(58) Field of Classification Search
CPC .................................................... H04B 7/0626
USPC .......................................................... 375/219
See application file for complete search history.

(56) References Cited

U.S. PATENT DOCUMENTS

2018/0145737 A1\* 5/2018 Rahman ............... H04B 7/0634

\* cited by examiner

*Primary Examiner* — Lihong Yu
(74) *Attorney, Agent, or Firm* — Kunzler Bean & Adamson

(57) ABSTRACT

Apparatuses, methods, and systems are disclosed for preparing a channel state information ("CSI") codeword. One apparatus includes a processor and a transceiver configured to communicate 805 with a transmit-receive point ("TRP") over a radio access network using spatial multiplexing, wherein multiple transmission layers are transmitted at a time, each transmission layer comprising multiple beams. The processor identifies a main beam for each of the multiple transmission layers and determines whether the main beams of each transmission layer are the same. The processor prepares a CSI codeword, wherein the CSI codeword comprises a first bit indicating whether the main beams of each transmission layer are the same, a first set of bits coding the main beams, and a second set of bits coding the remaining beams. The transceiver transmits the CSI codeword to the TRP.

20 Claims, 9 Drawing Sheets

| Number of Zeros (Nz) | Bits to Represent Zero Locations a | WB Amplitude Bits b | Total Bits [a + b] | VL Codeword for Nz Cond-A/Cond-B | Total Bits + VL Codeword Cond-A/Cond-B | Bit Savings Cond-A/Cond-B |
|---|---|---|---|---|---|---|
| 0 | 0 | 39.3 | 40 | N/A | 40 | 2 |
| 1 | 3.81 | 36.5 | 41 | 100/1100 | 44/45 | -2/-3 |
| 2 | 6.51 | 33.7 | 41 | 101/1101 | 44/45 | -2/-3 |
| 3 | 8.51 | 30.9 | 40 | 110/1110 | 43/44 | -1/-2 |
| 4 | 9.97 | 28.1 | 39 | 1110/11110 | 43/44 | -1/-2 |
| 5 | 10.96 | 25.3 | 37 | 11110/111110 | 42/43 | 0/-1 |
| 6 | 11.56 | 22.5 | 34 | 111110/1111110 | 40/41 | 2/1 |
| 7 | 11.75 | 19.7 | 32 | 1111110/11111110 | 39/40 | 3/2 |
| 8 | 11.56 | 16.9 | 29 | ... | 38 | 4 |
| 9 | 10.96 | 14.1 | 26 | ... | 36 | 6 |
| 10 | 9.97 | 11.3 | 22 | ... | 33 | 9 |
| 11 | 8.51 | 8.5 | 18 | ... | 30 | 12 |
| 12 | 6.51 | 5.7 | 13 | | 26 | 16 |
| 13 | 3.81 | 2.9 | 7 | | 20 | 22 |
| 14 | 0 | 0 | 0 | | | |

| Number of Zeros ($N_Z$) | Bits to Represent Zero Locations $a$ | WB Amplitude Bits $b$ | Location of L-2 beams $c$ | Total Bits $d=[a+b+c]$ | VL Codeword for $N_Z$ | Total Bits $d$ + VL Codeword | Bit Savings |
|---|---|---|---|---|---|---|---|
| 0 | 0 | 39.3 | 6.51 | 46 | N/A | 46 | 3 |
| 1 | 3.81 | 36.5 | 6.51 | 47 | 1100 | 51 | -2 |
| 2 | 6.51 | 33.7 | 6.51 | 47 | 1101 | 51 | -2 |
| 3 | 8.51 | 30.9 | 6.51 | 46 | 1110 | 50 | -1 |
| 4 | 9.97 | 28.1 | 6.51 | 45 | 11110 | 50 | -1 |
| 5 | 10.96 | 25.3 | 6.51 | 43 | 111110 | 49 | 0 |
| 6 | 11.56 | 22.5 | 6.51 | 41 | 1111110 | 48 | 1 |
| 7 | 11.75 | 19.7 | 6.51 | 38 | 11111110 | 47 | 2 |
| 8 | 11.56 | 16.9 | | 29 | ... | 38 | 4 |
| 9 | 10.96 | 14.1 | | 26 | ... | 36 | 6 |
| 10 | 9.97 | 11.3 | | 22 | ... | 33 | 9 |
| 11 | 8.51 | 8.5 | | 18 | ... | 30 | 12 |
| 12 | 6.51 | 5.7 | | 13 | | 26 | 16 |
| 13 | 3.81 | 2.9 | | 7 | | 20 | 22 |
| 14 | 0 | 0 | | 0 | | | |

CODING MAIN BEAM INFORMATION IN CSI CODEBOOK

FIELD

The subject matter disclosed herein relates generally to wireless communications and more particularly relates to CSI codebook parameters.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

The wireless communication systems, CSI feedback is used to report on current channel conditions. This is especially useful in FDD and FDMA systems where the downlink (DL) and uplink (UL) channels are not reciprocal. With MU-MIMO and spatial multiplexing, a receiving device, such as a UE, may need to report channel conditions for multiple channels or beams. Accordingly, much overhead is dedicated to CSI reporting in MU-MIMO and spatial multiplexing systems.

BRIEF SUMMARY

Methods for efficiently coding a channel state information ("CSI") codebook are disclosed. Apparatuses and systems also perform the functions of the methods. One method (e.g., of a user equipment) includes communicating with a transmit-receive point ("TRP") over a radio access network using spatial multiplexing. Here, multiple transmission layers are transmitted at a time, each transmission layer comprising multiple beams. The method includes identifying a main beam for each of the multiple transmission layers and determining whether the main beams of each transmission layer are the same. The method also includes preparing a CSI codeword and transmitting the CSI codeword to the TRP. Here, the CSI codeword comprises a first bit indicating whether the main beams of each transmission layer are the same, a first set of bits coding the main beams, and a second set of bits coding the remaining beams.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a diagram illustrating the number of bits needed to code wideband amplitudes according to a first embodiment of efficiently coding a CSI codebook;

FIG. 8 is a diagram illustrating the number of bits needed to code wideband amplitudes according to a second embodiment of efficiently coding a CSI codebook.

DETAILED DESCRIPTION

Figure 1:
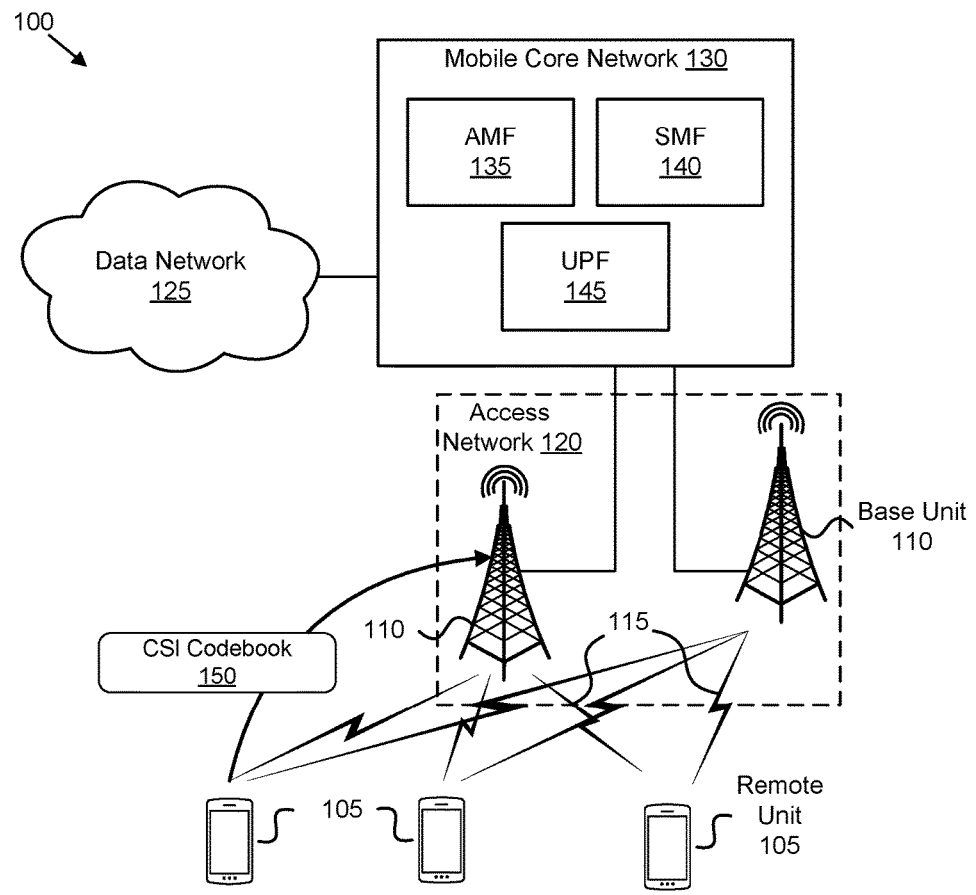
FIG. 1 is a schematic block diagram illustrating one embodiment of a wireless communication system for efficiently coding a CSI codebook and preparing a codeword therefrom.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In spatial multiplexing, the inventors have observed that most of the transmitted energy, e.g., 75% or more, is in the main beam of each transmission layer and that in about 85% of cases none of the selected beam vectors have zero amplitudes. The disclosed embodiments leverage this information to improve coding efficiency of codebook parameters for CSI feedback using a Type II codebook. As understood in the art, Type II codebooks provide high resolution information about current channel conditions and are used in multi-user MIMO ("MU-MIMO") scenarios, where spatial multiplexing is used to increase the number of users and/or to increase the transmission throughput (e.g., data bandwidth) for the users. In various embodiments, a transmitter will transmit a beamformed CSI-specific reference signal (e.g., a "CSI-RS") which the receiver uses to measure channel conditions. Generally, beamformed signals include a main beam and one or more remaining beams.

The present disclosure describes an improvement to coding a Type II CSI codebook which facilitates instantaneous decoding of the main beams without affecting the coding efficiency. The improved codebook also increases the efficiency for the case where none of the wideband beam amplitudes are zero, which is observed to be about 85% of the cases, at the expense of losing some efficiency when some of the beams have zero amplitudes. The improved codebook combines combinatorial coding with a variable length codeword that is based on the efficiency of the combinatorial code.

FIG. 1 depicts a wireless communication system 100 for efficiently coding a CSI codebook 150, according to embodiments of the disclosure. In one embodiment, the wireless communication system 100 includes at least one remote unit 105, an access network 120 containing at least one base unit 110, wireless communication links 115, and a mobile core network 130. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications (e.g., "5G NR"). More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 130 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number and type of network function may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

To support spatial multiplexing and MU-MIMO, the remote unit 105 provides CSI feedback to the base unit 110 using a Type II codebook. As discussed above, the remote unit 105 selects a codeword 155 from the CSI codebook 150, wherein the CSI codebook 150 uses both combinatorial coding and a variable length coding that is based on the efficiency of the combinatorial code. Here, the access network 120 and the remote units 105 all have copies of the same CSI codebook 150, wherein the remote unit 105 provides CSI feedback by transmitting a codeword 155 from the CSI codebook 150.

As a first example, consider the coding of wideband parameters in case of rank-2 (e.g., 2 transmission layers)

codebook with the number of antenna ports: 2 $N_1 \times N_2 = 32$, the number of beams: L=4 and each layer of the precoding matrix being linear combination of these L beams. The quantities, $N_1$, $N_2$ denote the number of dual-polarized antenna elements in two dimensions respectively. The factor of 2 accounts for the antenna array being composed of two antenna elements, each sensitive to orthogonal polarization (e.g. horizontal and vertical). Here, the gains of the linear combination coefficients used for combining the beams are different for both the polarizations, thereby making total of eight possible gains for each transmission layer (e.g., 4 beams×2 polarizations). In this example, the subband parameters may still be coded using the old approach, for example, not coding those subband parameters for which the wideband amplitude is zero.

To prepare the CSI feedback, the remote unit 105 first identifies and codes the main beam for each transmission layer. This is a departure from the conventional approach where the first step is identifying all the L beams. Note that the main beam of each layer can be any of $N_1 \times N_2 = 16$ beams. When the two main beams are the same, there are a total of 16 possibilities (not including the polarization part). When the two mains beams are different, there are C(16,2)=120 possibilities.

To code the main beams the remote unit 105 uses 1 bit to indicate whether the main beam of both the transmission layers are the same or not. For example, a value of '0' may indicate the main beams being the same, while a value of '1' may indicate that they are different. Where the beams are the same, 4 bits are needed to identify the main beam from the 16 possibilities. Where the beams are different, 7 bits are needed to indicate the combination of main beams from the 120 possibilities.

Additionally, the remote unit 105 uses one bit for each transmission layer to represent which polarization the main beam corresponds to. Accordingly, a total of 9 bits are needed if the main beams are different and 6 bits if they are same.

Next, the remote unit 105 identifies and codes the remaining beams. For the case where the main beams are the same, referred to herein as "Condition-A," the remote unit identifies L−1 remaining beams. For the case where the main beams are different, referred to herein as "Condition-B," the remote unit 105 identifies L−2 remaining beams.

$$C(15, 3) = \binom{15}{3} = \frac{15 \times 14 \times 13}{6} = 455,$$

In case where two beams are the same, Condition-A, there are possible selections of remaining beams, thus needing 9 bits to represent the remaining L−1 beams. In case two main beams are different, Condition-B, there are C(14,2)= $\binom{14}{2}$=possible selections for the remaining L−2 beams, which can be represented in 7 bits. In both cases, combinatorial coding is used to indicate the remaining beams.

Using the most efficient coding in the prior are still requires 11+3+3=17 bits to represent the set of L=4 beams and identify the main beams. In the improved coding described herein, coding all the beams and identifying the main beams requires a maximum of 17 bits (e.g., 1+6+9=16 for Condition-A, and 1+9+7=17 for Condition-B). Beneficially, the improved coding approach facilitates instantaneous decoding of the main beams. Another advantage of this approach is that the base unit 110 needs to decode at most 10 bits, instead of all 17 bits, to find the main beams.

In certain embodiments, such as about 15% of the cases, some of the wideband gains have a zero amplitude. Here, the remote unit 105 has already coded the main beams for the two transmission layers. At this point, there are seven more wideband beam amplitudes which need to be coded for each transmission layer. With two transmission layers, there are a total of fourteen remaining amplitudes to code. Here, the remote unit 105 uses a variable length code to code the number of non-zero beam amplitudes and uses enumerative or combinatorial coding to identify the beams with zero amplitudes. In certain embodiments, the remote unit 105 uses range coding to jointly combine the amplitudes of the non-zero beams. As understood in the art, "range coding" is a data encoding technique similar to, yet different from, arithmetic coding. This results in reduced codebook overhead for the large majority of cases where there are no non-zero beam vectors, even though codebook overhead increases when there are some zero amplitude beam vectors.

Recall that in the case where the two main beams are the same (Condition-A), the remote unit 105 is able to code the wideband parameters using 16 bits instead of 17 bits, so there was direct saving of 1 bit in that situation. For Condition-A (e.g., where both the main beams are the same), the remote unit 105 indicates whether there are any zero amplitude beam vectors by adding an extra bit to the coding of remaining beams, thus using 10 bits instead of 9 bits to code the remaining L−1. For example, the added bit may be set to '0' if none of the amplitudes of the remaining beam vectors in the two layers is zero; otherwise, the bit may be set to '1.' The case where the two main beams are different (Condition-B), the coding of the remaining beams is highly inefficient (e.g., coding 91 values out of 128 possibilities with the 7 bits). Here, the maximum codeword in this case, in binary, has a value of '1011010.' Because the coding does not have any mapped values that begin with '11,' in some embodiments, the remote unit 105 uses a variable length codeword starting with '11 . . . ' to indicate that there is a situation where at least one of the beam amplitudes is 0.

Figure 2:
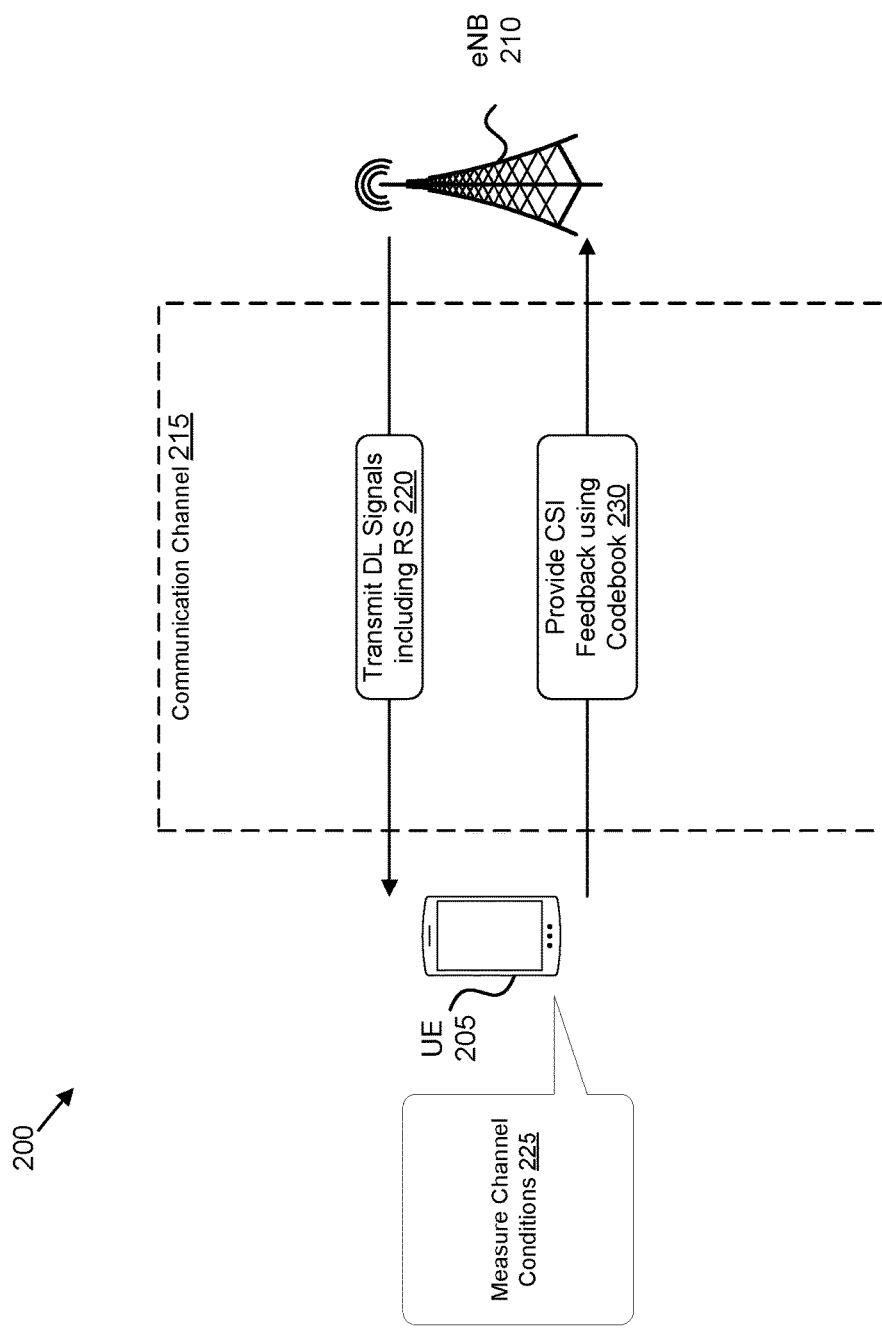
FIG. 2 is a block diagram illustrating one embodiment of a network architecture for efficiently coding a CSI codebook and preparing a codeword therefrom.

FIG. 2 depicts a network architecture 200 used for efficiently coding a CSI codebook and preparing a codeword therefrom, according to embodiments of the disclosure. The network architecture 200 may be a simplified embodiment of the wireless communication system 100. As depicted, the network architecture 200 includes a UE 205 in communication with a eNB 210. The UE 205 may be one embodiment of a remote unit 105 and the eNB 210 may be one embodiment of the base unit 110, described above. Here, the eNB 210 uses spatial multiplexing when communicating with the UE, where multiple transmission layers are transmitted, each layer having multiple beams.

As depicted, the eNB 210 transmits, on the downlink, various signals including multiple reference signals ("RS") (see signaling 220). These signals pass through the communication channel 215, e.g., the physical transmission medium. As the signals pass through the communication channel 215, they gradually weaken and encounter objects which alter their paths and degrade the signals. Upon receiving the downlink signals, the UE 205 measures the channel conditions (e.g., the "channel state") based on the received reference signals (see block 225).

The UE 205 provides channel state information ("CSI") feedback to the eNB 210 using a CSI codeword from a CSI codebook (see signaling 230). Specifically, the UE 205 selects a codeword from the CSI codebook based on the measured channel conditions, and transmits the codeword to the eNB 210. As the eNB 210 uses spatial multiplexing, the UE 205 selects (e.g., recommends) one codeword from a Type II Codebook to provide CSI feedback. In various embodiments, eNB 210 determines an optimum precoding matrix for the current channel conditions based on the CSI feedback. One procedure for preparing the CSI codeword is discussed below with reference to FIG. 6.

As used herein, a set of CSI codewords makes up the CSI codebook. The set of codewords in the CSI codebook may be parameterized by a set of parameters such that every combination of the parameters corresponds to codewords, and the set of codewords that are generated by all combinations of the parameters is the codebook. These parameters may be represented using bits, integers, or other values in a range (e.g., from 1 to some number). Here, the CSI codebook is coded using the improved approaches described herein, with beam information being the parameters used to select the codeword. When preparing the codeword, the UE 205 encodes the beam information using the described approaches to derive the codeword.

Figure 3:
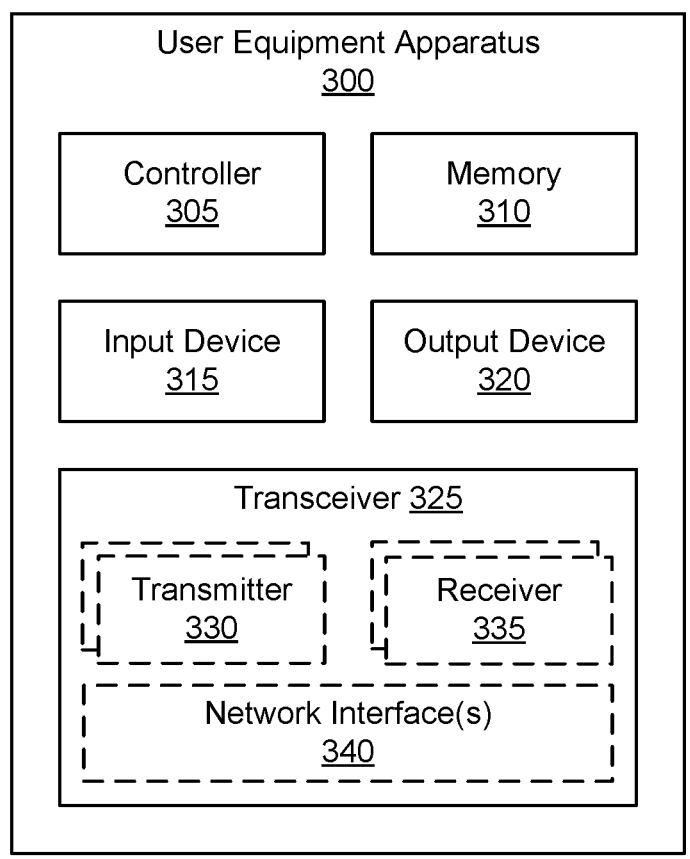
FIG. 3 is a schematic block diagram illustrating one embodiment of a user equipment apparatus for preparing a codeword from an efficiently coded CSI codebook.

FIG. 3 depicts one embodiment of a user equipment apparatus 300 that may be used for efficiently coding a CSI codebook and preparing a codeword therefrom, according to embodiments of the disclosure. The user equipment apparatus 300 may be one embodiment of the remote unit 105 and/or UE 205. Furthermore, the user equipment apparatus 300 may include a processor 305, a memory 310, an input device 315, a display 320, and a transceiver 325. In some embodiments, the input device 315 and the display 320 are combined into a single device, such as a touch screen. In certain embodiments, the user equipment apparatus 300 may not include any input device 315 and/or display 320.

As depicted, the transceiver 325 includes at least one transmitter 330 and at least one receiver 335. Additionally, the transceiver 325 may support at least one network interface 340. Here, the at least one network interface 340 facilitates communication with an eNB or gNB (e.g., using the Uu interface). Additionally, the at least one network interface 340 may include an interface used for communications with a network function in the mobile core network 130, such as an N1 interface used to communicate with the AMF 135. The transceiver 325 is configured to communicate with a transmit-receive point ("TRP"), such as the base unit 110 and/or the eNB 210, in a radio access network using spatial multiplexing, wherein multiple transmission layers are transmitted at a time, each transmission layer comprising multiple beams.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 identifies a main beam for each of the multiple transmission layers. During spatial multiplexing, the transceiver 325 may receive multiple beams and multiple transmission layers. The main beam (also referred to as a first beam) contains the majority of the transmission energy, for example greater than 70% of the transmitted power. The remainder of the energy is in the remaining beams (also referred to as secondary beams). Having identified the main beams for each transmission layer, the processor 305 determines whether the main beams are the same (e.g., are associated with the same antenna element) for each of the multiple transmission layers. Alternatively, the processor 305 determines whether the main beams are the same for the first two transmission layers or for each pair of transmission layers.

Additionally, the processor 305 prepares a channel state information ("CSI") codeword and controls the transceiver 425 to send the CSI codeword to the TRP. Here, the CSI codeword includes a first bit that indicating whether the main beams of each transmission layer are the same. The CSI codeword also includes a first set of bits coding the main beams and a second set of bits coding the remaining beams. In various embodiments, the CSI codeword belongs to a Type II codebook for CSI feedback.

In certain embodiments, the first set of bits coding the main beams includes one bit to indicate a main beam polarization for each transmission layer. In certain embodiments, the second set of bits coding the remaining beams uses combinatorial coding to indicate the remaining beams.

In certain embodiments, the number of transmission layers is two and the main beams are the same (e.g., Condition-A). Here, preparing the CSI codeword includes using enumerative coding to indicate a beam index of the main beam, in the first set of bits coding the main beam. In such embodiments, the CSI codeword may further include one bit to indicate whether the remaining beams all have non-zero wideband amplitudes. Where at least one remaining beam has a wideband amplitude of zero, then the second set of bits coding the remaining beams includes a variable length codeword to identify the at least one remaining beam having a wideband amplitude of zero.

In certain embodiments, the number of transmission layers is two and the main beams are not the same (e.g., Condition-B). Here, preparing the CSI codeword includes using combinatorial coding to indicate a combination of beam indexes corresponding to the main beams of the two transmission layers, in the first set of bits coding the main beams. In such embodiments, the second set of bits coding the remaining beams includes a variable length codeword with a specific prefix to indicate whether at least one of the remaining beams have a wideband amplitude of zero. Moreover, the remaining bits of the variable length code word are used to identify the at least one remaining beam having a wideband amplitude of zero. The length of the specific prefix, $L_p$, is derived from the efficiency of the combinatorial code, $E$, using a ceiling function and is given by the following equation:

$$L_p = \lceil -\log_2(1-2^{E-1}) \rceil, \qquad \text{Equation 1}$$

Here, the coding efficiency, E, is defined using the following equation, where X represents the number of values representable by the number of bits and Y represents the number of combinations that are coded:

$$E = 1-(\log_2 X - \log_2 Y), \qquad \text{Equation 2}$$

Note that for Condition-A, we have added an extra bit and hence we can say that efficiency is close to zero so the specific prefix for Condition-A has length of one, as calculated using Equation 1. Similarly, for Condition-B, efficiency calculated using Equation 2 is 0.51 and hence the length of the specific prefix calculated using Equation 1 is 2. The specific prefix is designed as all ones of length $L_p$.

In one embodiment, the second set of bits coding the remaining beams uses range coding to combine the amplitude of each remaining beam having a non-zero wideband amplitude with another CSI parameter.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to efficiently coding a CSI codebook, for example beam indices, beam amplitudes, codebooks, precoding matrices, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335. To support spatial multiplexing and/or beamforming, the transceiver 325 may include multiple transmitters 330 and/or multiple receivers 335.

Figure 4:
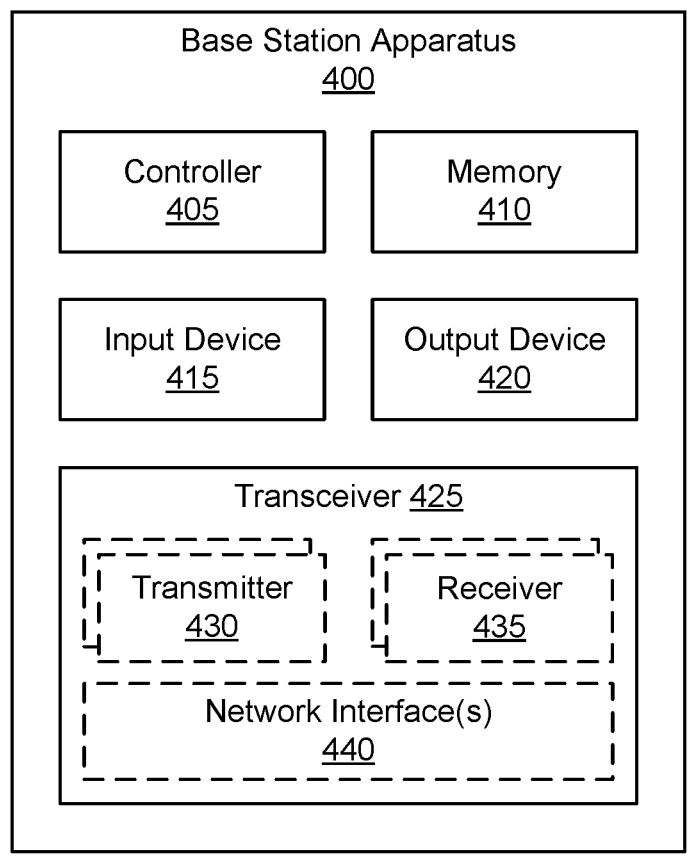
FIG. 4 is a schematic block diagram illustrating one embodiment of a base station apparatus for efficiently coding a CSI codebook.

FIG. 4 depicts one embodiment of a base station apparatus 400 that may be used for efficiently coding a CSI codebook, according to embodiments of the disclosure. The base station apparatus 400 may be one embodiment of the base unit 110 and/or the eNB 210. Furthermore, the base station apparatus 400 may include a processor 405, a memory 410, an input device 415, a display 420, and a transceiver 425. In some embodiments, the input device 415 and the display 420 are combined into a single device, such as a touch screen. In certain embodiments, the base station apparatus 400 may not include any input device 415 and/or display 420.

As depicted, the transceiver 425 includes at least one transmitter 430 and at least one receiver 435. Additionally, the transceiver 425 may support at least one network interface 440. Here, the at least one network interface 440 facilitates communication with a remote unit (such as the remote unit 105 and/or UE 205). Additionally, the at least one network interface 440 may include an interface used for communications with one or more network functions in a mobile network core, such as the N1 interface for communicating with the AMF 135.

In various embodiments, the transceiver 425 communicates with one or more remote units using spatial multiplexing, wherein multiple transmission layers are transmitted at a time, each transmission layer comprising multiple beams. To support spatial multiplexing, the transceiver 425 will include multiple transmitters 430 and receivers 435. As discussed above, the transceiver 425 transmits various downlink signals, including reference signals. The remote units determine the state of the physical channel (e.g., of the communication medium) based on the reference signals and send CSI feedback to the base station apparatus 400. Accordingly, the transceiver may receive a CSI codeword from a remote unit, the CSI codeword selected from a CSI codebook using parameters as described herein.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 is configured to decode a Type II CSI codeword that is encoded according to the embodiments described herein. Here, the processor 405 examines the first bit of the codeword to identify whether the main beams are the same for each transmission layer (or each pair of transmission layers). Then the processor 405 identifies a first set of bits that encode the main beam. Note that the length of the first set of bits varies based on whether the main beams are the same. For Condition-A, the length of the first set of bits depends on the number of antenna elements ($N_1 \times N_2$), which is known to the base station apparatus 400. For Condition-B, the length of the first set of bits depends on the number of antenna elements ($N_1 \times N_2$) and the number of transmission layers being coded, which is known to the base station apparatus 400.

The processor 405 further identifies a second set of bits that encode the remaining beams. Again, that the length of the second set of bits varies based on whether the main beams are the same. As there is at least one more remaining beam in Condition-A than in Condition-B, the length of the second set of bits is longer for Condition-A than for Condition-B.

In certain embodiments, enumerative coding is used to identify the main beam in Condition-A and combinatorial coding is used to identify the main beams in Condition-B. Moreover, combinatorial coding may be used to indicate the remaining beams. Where at least one remaining beam has a wideband amplitude of zero, then the second set of bits may include a variable length codeword having a specific prefix to indicate this situation, with the remaining bits of the variable length codeword being used to identifying the remaining beam(s) having a wideband amplitude of zero. Here, the length of the specific prefix is based on the coding efficiency of the combinatorial code used to indicate the remaining beams. In one embodiment, the specific prefix is all values of '1' in the length determined by the coding efficiency.

Moreover, the second set of bits coding the remaining beams may use range coding to jointly combine the amplitudes of each remaining beam having a non-zero wideband amplitude. Where the coding efficiency of the combinatorial code used to indicate the remaining beams is sufficiently inefficient, then the second set of bits coding the remaining beams may use range coding to combine the amplitude of each remaining beam having a non-zero wideband amplitude with another CSI parameter, thus saving bits and improving the overall coding efficiency of the CSI codebook. Here, the parameter combined with the second set of bits is known to the base station apparatus 400.

In some embodiments, the processor 405 may prepare a UL CSI codeword using parameters and procedures described herein. For example, the processor 405 may generate a UL CSI codeword having a first bit indicating whether the main beams of each transmission layer are the same, a first set of bits coding the main beams, and a second set of bits coding the remaining beams. The processor 405 may further control the transceiver 425 to send the UL CSI codeword, e.g., to a remote unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to efficiently coding a CSI codebook, for example beam indices, beam amplitudes, codebooks, precoding matrices, and the like. In certain embodiments, the memory 410 also stores program code and related data, such as an operating system or other controller algorithms operating on the base station apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. To support spatial multiplexing and beamforming, the transceiver 425 may include multiple transmitters 430 and/or multiple receivers 435.

Figure 5:
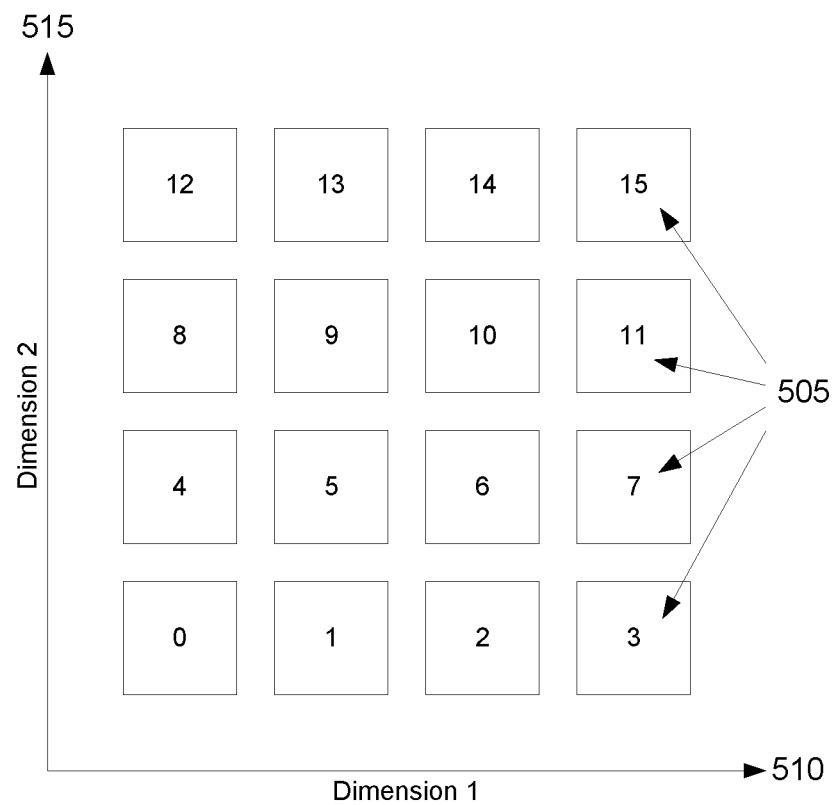
FIG. 5 is a block diagram illustrating one embodiment of antenna elements.

FIG. 5 depicts an array 500 of antenna elements 505 for efficiently coding a CSI codebook, according to various embodiments of the disclosure. Here, the antenna elements 505 are arranged into a 4×4 grid. As depicted, each antenna elements 505 has an index and the location of each antenna elements 505 may be described using coordinates of a first dimension 510 and a second dimension 515. For example, the antenna elements 505 of index 7 may be described using the coordinates {3,1} and the antenna elements 505 of index 12 may be described using the coordinates {3,0}. Note that the beam index may be identified using a 4-bit value. In some embodiments, each antenna elements 505 is a dual-polarized antenna element comprising two physical elements, each sensitive to orthogonal polarization.

An antenna port may correspond to one or more physical network elements. In certain embodiments, an antenna port corresponds to a set of orthogonally arranged antenna elements, such that the antenna port may produce a beam with a first polarization or a second polarization orthogonal to the first polarization. Thus, a dual-polarized antenna element may correspond to two antenna ports, one for each orthogonal polarization. In various embodiments, preparing a CSI codeword includes identifying a beam index of the main beam of a transmission layer. Here, the beam index may be the index of the corresponding (dual-polarized) antenna element. In certain embodiments, the CSI codeword uses combinatorial coding to identify the beam indexes of the main beams of multiple transmission layers.

Figure 6:
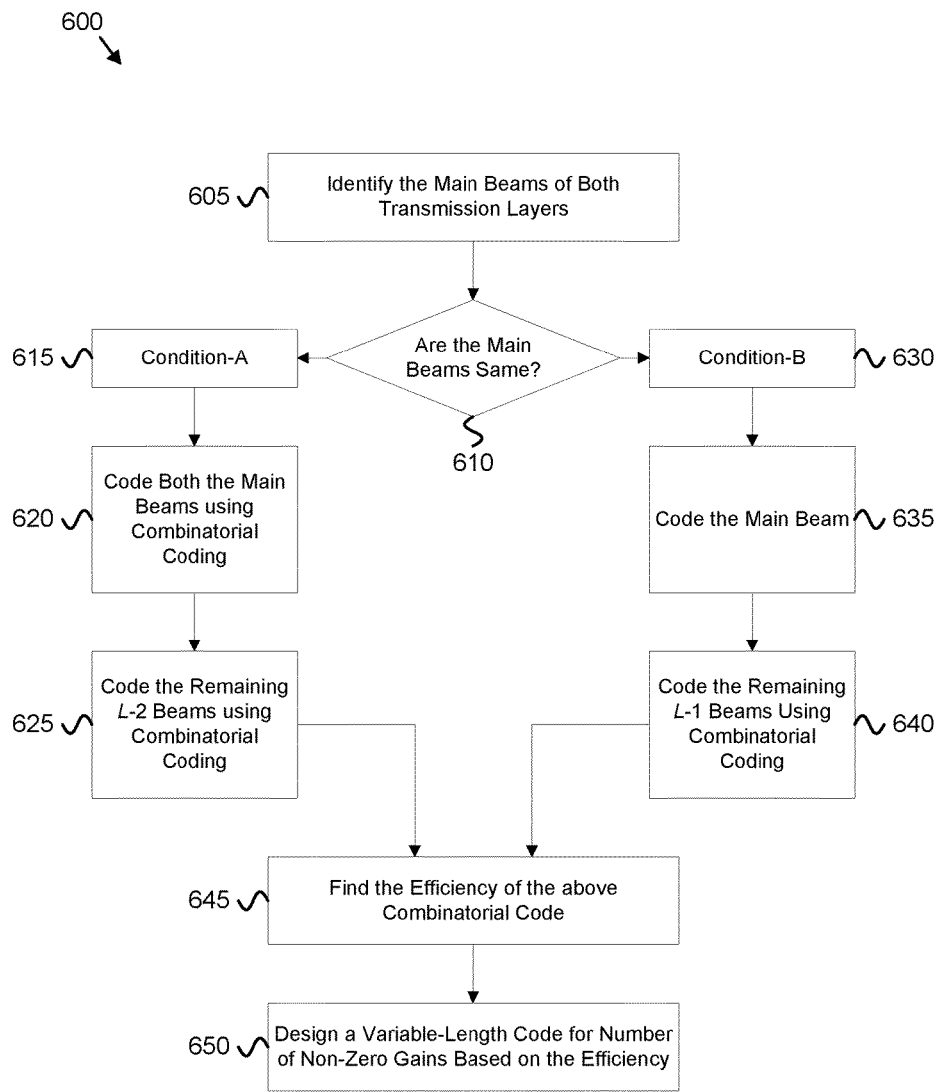
FIG. 6 is a block diagram illustrating one embodiment of a procedure for efficiently coding a CSI codebook and preparing a codeword therefrom.

FIG. 6 depicts a procedure 600 for efficiently coding a CSI codebook and preparing a codeword therefrom, according to various embodiments of the disclosure. The procedure 600 may be performed by a communication device preparing a codeword from a CSI type II codebook, such as the remote unit 105, the UE 205, and/or the user equipment apparatus 300, described above. The procedure 600 assumes that $N_1 \times N_2$ is 16 (e.g., there are 16 antenna elements resulting in 32 antenna ports) and that there are two transmission layers. The number of beam is represented by L.

At block 605, the communication device identifies the main beams of both transmission layers (instead of identifying the L beams in the conventional approach). The main beam for each transmission layer may be the same or different. Moreover, the main beam of each transmission layer can be any of $N_1 \times N_{2=16}$ beams (ignoring the polarization part).

At decision block 610, the communication device determines whether the main beams are the same. In response to the main beams being the same, the communication device determines the Condition-A applies (see block 615) and codes the main beam (see block 620). Because in Condition-A there are sixteen possibilities for the main beam, only four bits are needed to code the main beam. Note that one bit for each layer is needed to represent which polarization the main beam corresponds to, thus a total of six bits are required to code the main beams in Condition-A. At block 625, the communication device codes the remaining beams (L−1 beams) using combinatorial coding. The number of bits needed for the combinatorial coding of the remaining beams in Condition-A, $N_A$, is determined using the following equation:

$$N_A = \log_2(C(((N_1 \times N_2) - 1), (L-1))) = \log_2\left(\binom{((N_1 \times N_2) - 1)}{(L-1)}\right),$$ Equation 3

Where L equals four, the number of bits, $N_A$, is 9 due to there being 455 possible selections (e.g., C(15,3)=455).

In contrast, in response to the main beams not being the same, the communication device determines the Condition-B applies (see block 630) and codes the main beam using combinatorial coding (see block 635). In Condition-B there are 120 possibilities (e.g., due to C(16,2)=120). This requires seven bits to code the two main beams. Again, one bit for each layer is needed to represent which polarization the main beam corresponds to, thus a total of nine bits are required to code the main beams in Condition-B. At block 640, the communication device codes the remaining beams (L−2 beams) using combinatorial coding. The number of bits needed for the combinatorial coding of the remaining beams in Condition-B, NB, is determined using the following equation:

$$N_B = \log_2(C(((N_1 \times N_2) - 2), (L-2))) = \log_2\left(\binom{((N_1 \times N_2) - 2)}{(L-2)}\right),$$ Equation 4

Where L equals four, the number of bits, NB, is 7 due to there being 91 possible selections (e.g., C(14,2)=91). After both coding the main beam(s) and coding the remaining beams, the communication device finds the efficiency of the combinatorial code (see block 645), for example using Equation 2.

In Condition-A, 455 combinations are coded out of a possible 512 values representable by 9 bits, thus the combinatorial coding of the remaining beams has an efficiency of E=0.83. In Condition-B, 91 combinations are coded out of a possible 128 values representable by 7 bits, thus the combinatorial coding of the remaining beams has an efficiency of E=0.51. Clearly, the combinatorial coding of the remaining beams in Condition-B is fairly inefficient.

At block 650, the communication device designs a variable-length code for the number of non-zero gains based on the calculated efficiency. The variable-length codeword is further discussed below with reference to FIGS. 7 and 8. Here, under Condition-B, the codeword for L−2 beams can be combined with other parameters (e.g., using range coding) to improve the overall coding efficiency. FIG. 8 depicts one example of combining parameters in order to improve coding efficiency.

Using conventional coding, 17 bits (11+3+3) are needed to represent a set of L=4 beams and to identify the main beams. In Condition-A, only 16 bits are needed (e.g., 1 indicating that the layers have the same main beam, 6 for coding the main beam, and 9 for coding the remaining beams), resulting in a bit savings of 1 as compared to previous Type II Codebook coding. In Condition-B, 17 bits are needed (e.g., 1 indicating that the layers have different main beams, 9 for coding the main beam combination, and 7 for coding the remaining beams). Beneficially, the procedure 600 facilitates instantaneous decoding of the main beams. Moreover, the TRP only needs to decode a most 10 bits (instead of the conventional 17 bits) in order to find the main beams using the disclosed codebook.

FIG. 7 depicts a first table 700 illustrating the number of bits needed to code wideband amplitudes for the remaining beams, according to various embodiments of the disclosure. Here, it is assumed that $N_1 \times N_2$ is 16 (e.g., there are 16 antenna elements and 32 antenna ports), that there are two transmission layers and two polarizations, and that the number of beams, L, is 4. With two polarizations and four beams, each layer has a total of eight possible wideband gains (amplitudes), for a total of 16 amplitudes to code. The table 700 includes a column with the number of zeros, $N_Z$, and a column with the number of bits to represent the zero locations, a. The value of a is calculated using the following equation:

$$a = \log_2(C(14, N_Z))$$ Equation 5

Here, C(14, Nz) is the combination of 14 and Nz. The values of 14 is selected as this is the number of remaining amplitudes (e.g., the 16 amplitudes less the two main beams). Note that with four beams (e.g., $(N_1 \times N_2) - 2$). In other embodiments, the value of 14 in Equation 5 may be replaced with $N_R$, where $N_R$ represents the number of number of remaining amplitudes (e.g., after coding the main beams of each transmission layer). Note that the values of a are not integer values. This is due to the inefficiency of the combinatorial code used to represent the zero locations.

The table 700 also includes a column with the number of bits needed to code the wideband amplitudes, b. The value of b can be calculated using the following equation:

$$b = (14 - N_Z) \times \log_2(7)$$ Equation 6

Again, 14 is the number of remaining amplitudes and, in other embodiments, the value of 14 may be replaced with $N_R$ in Equation 6. As discussed above, inefficient combinatorial codes may be combined with other parameters, in order to improve efficiency and save bits. In certain embodiments, different coding techniques may be used when combining parameters to improve the coding efficiency. An example of combining parameters to improve efficiency is show in FIG. 8.

The table 700 includes a column with the total number of bits, c, needed to indicate the zero locations and the remaining wideband amplitudes. The table 700 also shows a variable length codeword used to signal $N_Z$. Also included is a column with a sun of the total number of bits, c, and the length of the variable length codeword. Additionally, the table 700 includes a column with the bit savings for each value of $N_Z$. Recall, that the most efficient prior art coding requires 42 bits to code the wideband amplitudes of the secondary beams.

As shown, there is bit savings when there are no non-zero amplitude beams, which is the case about 85% of the time. However, there is an increase in needed bits to code wideband amplitudes when number of zero ($N_Z$) wideband amplitudes are 1, 2, 3 and 4. Recall that if any wideband amplitude is zero, then the corresponding sideband phase and sideband amplitude is not coded. Thus, even after using few extra bits for coding of wideband amplitudes, the coding described herein will not increase the worst-case bits and in fact there is a saving on the worst-case bits for the improved coding of Type II codebook as described herein.

Note that under Condition-B, the number of bits needed the are one more than the number of bits needed to code under Condition-A. Also note, that for Condition-B, the first two bits of the variable length codeword are used to identify whether there are some zero wideband amplitudes. Even so, Condition-B needs 7 bits to code the L−2 remaining beams while using only 91 combinations out of possible 128. This makes the codeword highly inefficient, as discussed above. When parameters are inefficiently coded, parameters may be combined, e.g., with range coding, to improve efficiency.

FIG. 8 depicts a second table 800 illustrating the number of bits needed to code beam location and wideband amplitudes for remaining beams, according to various embodiments of the disclosure. Here, it is assumed the $N_1 \times N_2$ is 16 (e.g., there are 16 antenna elements resulting in 32 antenna ports) and there are two transmission layers. In the table 800, the locations of the remaining beams are combined with the amplitude information to improve coding efficiency, thereby saving an additional bit in the Condition-B. Thus, by including the beam location information, the codeword length for Condition-A and Condition-B become the same. In various embodiments, the remaining beam information (e.g., both location and amplitude information) uses range encoding.

As depicted, the table 800 includes a column with the number of zeros, $N_Z$, a column with the number of bits to represent the zero locations, a (calculated using the Equation 4), and a column with the number of bits needed to code the wideband amplitudes, b (calculated using the Equation 5). The table 800 also includes a column with the number of bits needed to indicate the location of the L−2 beams (here, the fixed value of 6.51) and total number of bits, d, needed to indicate the zero locations, the remailing wideband amplitudes, and the beam locations. The table 700 also shows a variable length codeword used to signal $N_Z$. Also included is a column with a sun of the total number of bits, c, and the length of the variable length codeword. Additionally, the table 700 includes a column with the bit savings for each value of $N_Z$. Note, that the most efficient prior art coding requires 49 bits (e.g., 42+7) to code the wideband amplitudes and beam locations of the secondary beams.

As shown, there is improved bit savings when there are no non-zero amplitude beams, which is the case about 85% of the time. Moreover, the combined parameter coding approach requires fewer additional bits, as compared to the table 700, for the situations where there are 1, 2, 3, or 4.

Figure 9:
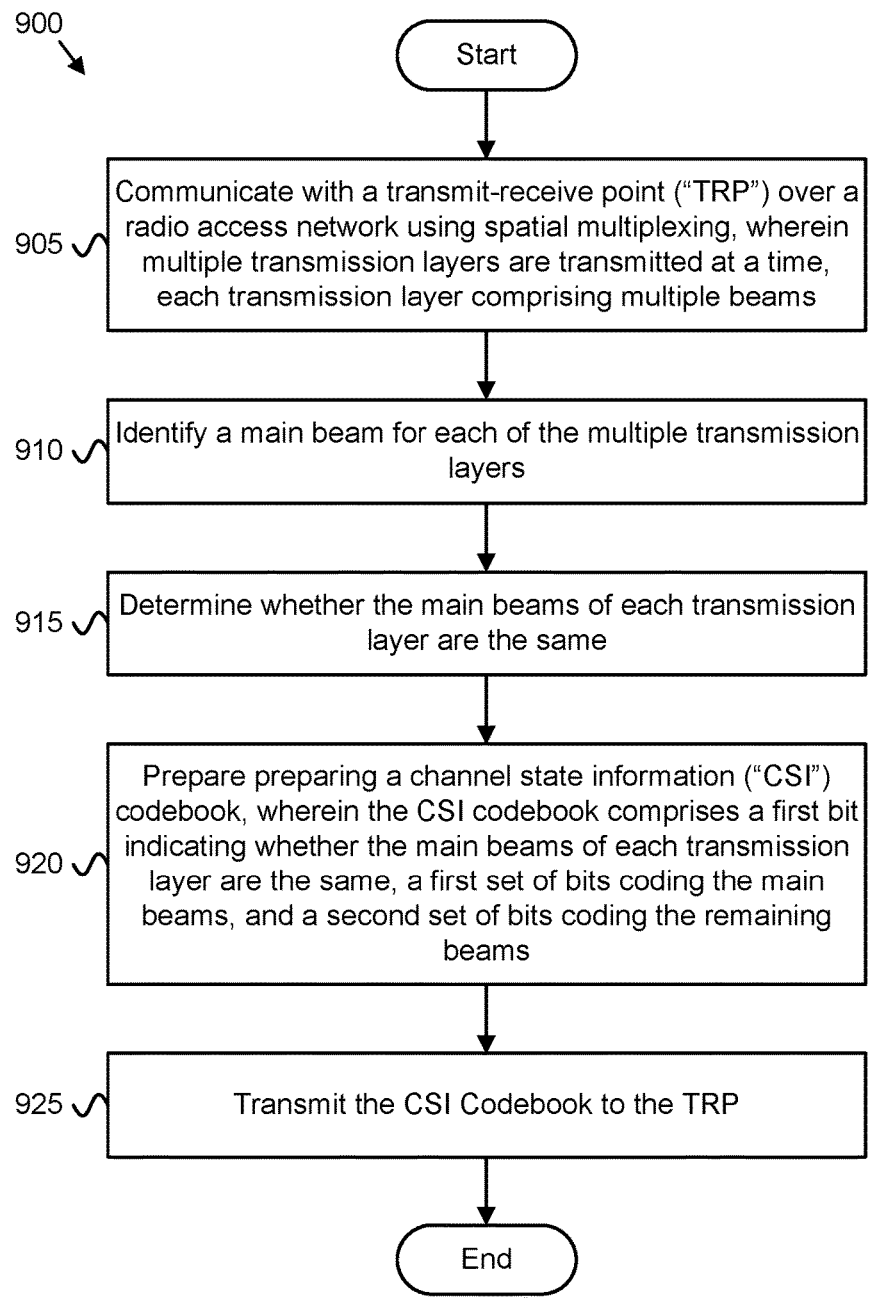
FIG. 9 is a flow chart diagram illustrating one embodiment of a method for efficiently coding a CSI codebook and preparing a codeword therefrom.

FIG. 9 depicts a method 900 for efficiently coding a CSI codebook and preparing a codeword therefrom, according to embodiments of the disclosure. In some embodiments, the method 900 is performed by an apparatus, such as the remote unit 105, the UE 205, and/or the user equipment apparatus 300. In certain embodiments, the method 900 may be performed by a processor executing program code, for example, a microcontroller, a microprocessor, a CPU, a GPU, an auxiliary processing unit, a FPGA, or the like.

The method 900 begins with communicating 905 with a transmit-receive point ("TRP") over a radio access network using spatial multiplexing. Here, multiple transmission layers are transmitted at a time, each transmission layer comprising multiple beams. In one example, communicating 905 includes a UE receiving two transmission layers and four beams, with $N_1 \times N_2 = 16$.

The method 900 includes identifying 910 a main beam for each of the multiple transmission layers and determining 915 whether the main beams of each transmission layer are the same. As discussed above, the apparatus uses different codebook parameters based on whether the main beams of each transmission layer are the same.

The method 900 includes preparing 920 a channel state information ("CSI") codeword. Here, the CSI codeword comprises a first bit indicating whether the main beams of each transmission layer are the same, a first set of bits coding the main beams, and a second set of bits coding the remaining beams. In some embodiments, the first set of bits coding the main beams includes one bit to indicate a main beam polarization for each transmission layer. In some embodiments, the second set of bits coding the remaining beams uses combinatorial coding to indicate the remaining beams.

The method 900 includes transmitting 925 the CSI codeword to the TRP. The method 900 ends. In certain embodiments, the number of transmission layers is two and the main beams are the same. Here, the CSI codeword may use enumerative coding to indicate a beam index of the main beam, in the first set of bits coding the main beam. In such embodiments, the CSI codeword may further include one bit to indicate whether the remaining beams all have non-zero wideband amplitudes. Where at least one remaining beam has a wideband amplitude of zero, then the second set of bits coding the remaining beams includes a variable length codeword to identify the at least one remaining beam having a wideband amplitude of zero.

In certain embodiments, the number of transmission layers is two and the main beams are not the same. Here, the CSI codeword may use combinatorial coding to indicate a combination of beam indexes corresponding to the main beams of the two transmission layers, in the first set of bits coding the main beams. In such embodiments, the second set of bits coding the remaining beams includes a variable length codeword with a specific prefix to indicate whether at least one of the remaining beams have a wideband amplitude of zero. Moreover, the specific prefix may be a two-bit value at the beginning of the variable length codeword, wherein the remaining bits of the variable length code word are used to identify the at least one remaining beam having a wideband amplitude of zero. Recall that the length of the specific prefix is based on the coding efficiency of the combinatorial code used to encode the remaining beams. For Condition-B (e.g., where the two main beams are not the same) with $N_1 \times N_2 = 16$ and $L=4$, the coding efficiency is 0.51 (using Equation 2) and the prefix length is 2 (using Equation 1). In one embodiment, the second set of bits coding the remaining beams uses range coding to combine the amplitude of each remaining beam having a non-zero wideband amplitude with another CSI parameter.

The above described embodiments focus of the situation of $N_1 \times N_2 = 16$, $L=4$, and 2 transmission layers. However, the coding approach described herein also applies to other cases by coding the main beams, finding the efficiency of various combinatorial codes used for coding the remaining beams, then adopting a variable length codeword based on the efficiency of the combinatorial coding. In certain embodiments, inefficiently coded parameters may be combines to improve the coding efficiency. Moreover, range coding may be used with inefficient combinatorial codes to improve the coding efficiency.

In one embodiment where the number of transmission layers exceeds 2, the above coding procedure (e.g., coding the main beams, coding the remaining beams, etc.) is used for the first two transmission layers, while conventional coding techniques are used for the remaining transmission layers. In another embodiment where the number transmission layers exceeds 2, the above coding procedure (e.g., coding the main beams, coding the remaining beams, etc.) is used for pairs of transmission layers, with conventional coding techniques being used for any remaining transmission layers.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a transceiver configured to communicate with a transmit-receive point ("TRP") over a radio access network using spatial multiplexing, wherein multiple transmission layers are transmitted at a time, each transmission layer comprising multiple beams; and
    a processor that:
    identifies a main beam for each of the multiple transmission layers;
    determines whether the main beams of each transmission layer are the same; and
    prepares a channel state information ("CSI") codeword, wherein the CSI codeword comprises a first bit indicating whether the main beams of each transmission layer are the same, a first set of bits coding the main beams, and a second set of bits coding the remaining beams, wherein the length of the first set of bits is selected based on whether the main beams of each transmission layer are the same,
    wherein the transceiver transmits the CSI codeword to the TRP.

2. The apparatus of claim 1, wherein the first set of bits coding the main beams includes one bit to indicate a main beam polarization for each transmission layer, wherein the second set of bits coding the remaining beams uses combinatorial coding to indicate the remaining beams.

3. The apparatus of claim 1, wherein the number of transmission layers is two and the main beams are the same, wherein the set of main beam coding bits uses enumerative coding to indicate a beam index of the main beam.

4. The apparatus of claim 3, wherein the CSI codeword further includes one bit to indicate whether the remaining beams all have non-zero wideband amplitudes.

5. The apparatus of claim 3, wherein at least one remaining beam has a wideband amplitude of zero, wherein the second set of bits coding the remaining beams includes a variable length codeword to identify the at least one remaining beam having a wideband amplitude of zero.

6. The apparatus of claim 1, wherein the second set of bits coding the remaining beams uses range coding to jointly combine the amplitudes of each remaining beam having a non-zero wideband amplitude.

7. The apparatus of claim 1, wherein the number of transmission layers is two and the main beams are not the same, wherein the set of main beam coding bits uses combinatorial coding to indicate a combination of beam indexes corresponding to the main beams of the two transmission layers.

8. The apparatus of claim 1, wherein the second set of bits coding the remaining beams includes a variable length codeword with a specific prefix to indicate whether at least one of the remaining beams have a wideband amplitude of zero.

9. The apparatus of claim 8, wherein the length of the specific prefix is based on the coding efficiency of a combinatorial code used in coding the remaining beams, wherein the remaining bits of the variable length code word are used to identify the at least one remaining beam having a wideband amplitude of zero.

10. The apparatus of claim 1, wherein the second set of bits coding the remaining beams uses range coding to combine the amplitude of each remaining beam having a non-zero wideband amplitude with another CSI parameter.

11. A method comprising:
    communicating with a transmit-receive point ("TRP") over a radio access network using spatial multiplexing, wherein multiple transmission layers are transmitted at a time, each transmission layer comprising multiple beams;
    identifying a main beam for each of the multiple transmission layers;
    determining whether the main beams of each transmission layer are the same;
    preparing a channel state information ("CSI") codeword, wherein the CSI codeword comprises a first bit indicating whether the main beams of each transmission layer are the same, a first set of bits coding the main beams, and a second set of bits coding the remaining beams, wherein a length of the first set of bits is a first length in response to the main beams of each transmission layer being the same, and the length of the first set of bits is a second length in response to the main beams of each transmission layer not being the same, the first length being different than the second length; and
    transmitting the CSI codeword to the TRP.

12. The method of claim 11, wherein the first set of bits coding the main beams includes one bit to indicate a main beam polarization for each transmission layer, wherein the second set of bits coding the remaining beams uses combinatorial coding to indicate the remaining beams.

13. The method of claim 11, wherein the number of transmission layers is two and the main beams are the same, wherein the set of main beam coding bits uses enumerative coding to indicate a beam index of the main beam.

14. The method of claim 13, wherein the CSI codeword further includes one bit to indicate whether the remaining beams all have non-zero wideband amplitudes.

15. The method of claim 13, wherein at least one remaining beam has a wideband amplitude of zero, wherein the second set of bits coding the remaining beams includes a variable length codeword to identify the at least one remaining beam having a wideband amplitude of zero.

16. The method of claim 11, wherein the second set of bits coding the remaining beams uses range coding to jointly combine the amplitudes of each remaining beam having a non-zero wideband amplitude.

17. The method of claim 11, wherein the number of transmission layers is two and the main beams are not the same, wherein the set of main beam coding bits uses combinatorial coding to indicate a combination of beam indexes corresponding to the main beams of the two transmission layers.

18. The method of claim 11, the second set of bits coding the remaining beams includes a variable length codeword with a specific prefix to indicate whether at least one of the remaining beams have a wideband amplitude of zero.

19. The method of claim 18, wherein the length of the specific prefix is based on the coding efficiency of a combinatorial code used in coding the remaining beams, wherein the remaining bits of the variable length code word are used to identify the at least one remaining beam having a wideband amplitude of zero.

20. The method of claim 11, wherein the second set of bits coding the remaining beams uses range coding to combine the amplitude of each remaining beam having a non-zero wideband amplitude with another CSI parameter.

* * * * *